(12) United States Patent
Eckl et al.

(10) Patent No.: US 10,525,992 B2
(45) Date of Patent: Jan. 7, 2020

(54) LIGHT SIGNAL

(71) Applicant: SIEMENS MOBILITY GMBH, Munich (DE)

(72) Inventors: Rolf Eckl, Berlin (DE); Kay Koester, Fredersdorf (DE); Zeljko Marincic, Berlin (DE)

(73) Assignee: Siemens Mobility GmbH, Munich (DE)

( * ) Notice: Subject to any disclaimer, the term of this patent is extended or adjusted under 35 U.S.C. 154(b) by 189 days.

(21) Appl. No.: 15/542,941

(22) PCT Filed: Jan. 7, 2016

(86) PCT No.: PCT/EP2016/050149
§ 371 (c)(1),
(2) Date: Jul. 12, 2017

(87) PCT Pub. No.: WO2016/113163
PCT Pub. Date: Jul. 21, 2016

(65) Prior Publication Data
US 2018/0009453 A1    Jan. 11, 2018

(30) Foreign Application Priority Data

Jan. 12, 2015  (DE) .................. 10 2015 200 247

(51) Int. Cl.
| | |
|---|---|
| *B61L 5/18* | (2006.01) |
| *F21V 3/00* | (2015.01) |
| *G02F 1/01* | (2006.01) |
| *H05B 37/02* | (2006.01) |
| *F21Y 115/10* | (2016.01) |

(52) U.S. Cl.
CPC .............. *B61L 5/1845* (2013.01); *F21V 3/00* (2013.01); *G02F 1/0105* (2013.01); *H05B 37/0227* (2013.01); *B61L 2207/02* (2013.01); *F21Y 2115/10* (2016.08)

(58) Field of Classification Search
CPC ......... G08G 1/095; F21V 9/40; F21V 14/003; F21V 3/04; B61L 2207/02; B61L 5/1845; G02F 1/0018; G02F 1/0045; G02F 1/0105
See application file for complete search history.

(56) References Cited

U.S. PATENT DOCUMENTS

| | | | |
|---|---|---|---|
| 4,652,851 A | 3/1987 | Lewin | |
| 4,791,418 A * | 12/1988 | Kawahara | ........... G02F 1/13306 345/102 |
| 5,412,492 A | 5/1995 | Zammit et al. | |

(Continued)

FOREIGN PATENT DOCUMENTS

| | | |
|---|---|---|
| CN | 101178446 A | 5/2008 |
| DE | 19608886 C2 | 8/1998 |

(Continued)

*Primary Examiner* — Zachary L Kuhfuss
(74) *Attorney, Agent, or Firm* — Laurence Greenberg; Werner Stemer; Ralph Locher

(57) ABSTRACT

A light signal, in particular for rail-bound traffic routes, includes a control device which controls a light source, and an optical system for visualizing a signal term. In order to more precisely adjust brightness boundaries, light distribution and phantom light intensity, a transmission-controllable smart-glass element is provided in an aperture segment of the light flow.

9 Claims, 1 Drawing Sheet

(56) References Cited

U.S. PATENT DOCUMENTS

| | | | | |
|---|---|---|---|---|
| 5,636,056 | A | * | 6/1997 | Itonaga ............... F21S 48/2212 |
| | | | | 359/601 |
| 5,764,316 | A | * | 6/1998 | Takizawa ................ F21V 11/00 |
| | | | | 349/1 |
| 6,731,433 | B2 | | 5/2004 | Jacobsen et al. |
| 7,654,681 | B2 | * | 2/2010 | Kim ................... C09K 11/7734 |
| | | | | 362/97.4 |
| 10,203,514 | B2 | * | 2/2019 | Ohno ................... G02B 27/646 |
| 10,328,958 | B2 | * | 6/2019 | Eckl ...................... B61L 5/1845 |
| 2009/0213283 | A1 | * | 8/2009 | Burlingame ........... G02C 7/101 |
| | | | | 349/14 |

FOREIGN PATENT DOCUMENTS

| | | |
|---|---|---|
| DE | 102008039188 A1 | 5/2010 |
| DE | 102013207416 A1 | 10/2014 |
| EP | 1215640 A2 | 6/2002 |
| GB | 2497757 A | 6/2013 |

* cited by examiner

LIGHT SIGNAL

BACKGROUND OF THE INVENTION

Field of the Invention

The invention relates to a light signal, in particular for rail-bound traffic routes, with a control device, which controls a light source and an optical system for visualizing the signal term.

In principle light signals serve as signal transmitters or symbol indicators, which convey specific information by coloring or forming an illuminating surface, in other words by means of directional characteristics. This frequently involves safety-relevant information, which in no case may be optically falsified or superimposed by extraneous light. The unwanted illumination or falsification of a light spot due to the incidence of ambient light, for instance solar irradiation or spotlight, is referred to as phantom effect. In extreme cases the phantom effect may lead to an incorrect display due to an untimely illumination of a light spot or a color shift. This effect is particularly bothersome when LED arrangements are used as a light source, since LEDs can be made to illuminate by arriving light or rear reflectors are frequently used in LED light sources. Aside from the phantom generators which can be predicted in the project planning, for instance the setting sun for signals in the east-west orientation, sporadic or unpredictable sources also appear for phantoms, for instance vehicle headlights or construction floodlights, reflections on surfaces, for instance on glazed fronts or layers of snow. Therefore a signal which has to be phantom-safe on account of the location can also be susceptible to phantoms. Attempts are generally made to minimize the phantom effect by means of screens, hoods, avoiding east-west orientation or by repeating critical signals.

The explanations below relate substantially to light signals for displaying signal terms in rail-bound traffic routes, without the claimed subject matter being restricted to this application.

With railway signals, it must be ensured that the driver can always clearly identify the signal intended for him when approaching it. In such cases different track geometries, in other words straight tracks, curves and/or height differences, have to be taken into account. Aside from the far range display, a near range display of the signal term is also required, so that the driver can then also identify the light signal if he is directly in front of the signal.

The light signals for rail-bound traffic routes are subject to stringent requirements that may be relevant to the permissible brightness boundaries, the spatial light distribution and the phantom light intensity.

FIG. 1 shows a schematic representation of the structure of a known light signal.

A housing 1 is provided here, in which an LED light source 2 with secondary optics, for instance optical fibers or lenses, for light mixing and beam forming purposes and an optical system 3 are integrated. The optical system 3 consists substantially of a front lense 4, at least one diffusion disc 5 and lense surface 6, wherein these components can also be embodied as a combined part. A control device 7 is connected with a useful light sensor 8 within the housing 1 for the purpose of detecting intensity and/or color of the light flow. The control device 7 applies the LED light source 2 with the measured values of the useful light sensor 8 and target parameters predetermined by a signal box.

The diffusion disc 5 is preferably provided with a diffusion segment for visualizing the signal term in the near range, wherein a graying of the diffusion disc 5 counteracts the phantom effect. However, a compromise inevitably occurs with this merging of the light diffusion and the reduction in the phantom effect, which results in the phantom protection effect not being adequate at least for the group of ground-level light signals, which are emitted upward in the near range. On account of the dependency on the control parameters predetermined on the signal box side, a number of neutral gray filters and/or grayish colored diffusion discs 5 are required in order to achieve the optical power consumption ratings. The spread of the transmissions of neutral gray filters used spans a light throughput here of approx. 3% to beyond 70%. The degree of transmission required is generated here by selecting the filter material and adjusting the material thickness. In such cases aside from the mechanical installation conditions, the neutral gray filter must also adhere to the optical requirements with respect to color neutrality and long-term stability.

SUMMARY OF THE INVENTION

The object underlying the invention is to specify a light signal of the generic type, in which impairment to the safety as a result of curvy tracks, near and far range illumination and phantom effect can largely be avoided.

In accordance with the invention, the object is achieved in that a transmission-controllable smart-glass element is provided in an aperture segment of the light flow.

With smart-glass technology, the transmission properties of a disc-shaped element are changed by applying an electrical voltage, by heat or incident light. Smart-glass can be varied substantially continuously, whereas the typical diffusion discs only have discrete transmission values and are therefore only used widely when combined. Moreover, smart-glass elements are not dependent on the material thickness. The constant further development of the smart-glass technology makes ever changing smart-glass elements available at increasingly lower prices. There is the option, in the event of a fault or when the phantom effect is too great, to switch the smart-glass element of the light signal to opaque or translucent or in the event of modified set-up conditions to easily adjust the light intensity by means of an ambient light sensor. Diffuse or scatter properties of the smart-glass element can also be set for the purpose of shaping the light distribution. The smart-glass element can completely replace the diffusion discs and neutral gray filters typically used.

According to an embodiment of the invention, the smart-glass element is arranged between the light source and the simplified diffusion disc-free optical system. On account of this arrangement in conjunction with the positioning of the light source and of the optical system, if applicable also of mirrors and other components of the light signal, different beam geometries and thus different light distributions can optionally be realized in order to illuminate different track courses and/or near and far range illumination and/or to reduce the phantom effect.

The smart-glass element can be used for beam forming. For instance, according to embodiments of the invention, the smart-glass element can be arranged such that it projects into the light flow. Furthermore, the smart-glass element can project into part of the light flow and/or the light signal can have a number of smart-glass elements, which are arranged such that they project to differing degrees into the light flow.

The control device of the light source according to an embodiment of the invention is preferably embodied additionally also to control the transmission of the smart-glass element. This produces a simple structure, wherein the typically available useful light sensor within the light signal housing can also be used to set the transmission value of the smart-glass element.

In addition or alternatively, the control device according to an embodiment of the invention can be connected to at least one ambient light sensor. By taking the ambient light into account in order to set the transmission values of the smart-glass element, a continual adjustment to day, dusk and night viewing ratios can be realized for instance.

Provision is made in accordance with an embodiment of the invention for the smart-glass element to have a number of separate transmission-controllable circular-segment-shaped smart-glass discs. In this way various influencing variables can be combined very easily and set optimally.

BRIEF DESCRIPTION OF THE SEVERAL VIEWS OF THE DRAWING

The invention is explained in more detail below on the basis of figurative representations, in which.

DESCRIPTION OF THE INVENTION

Figure 1:
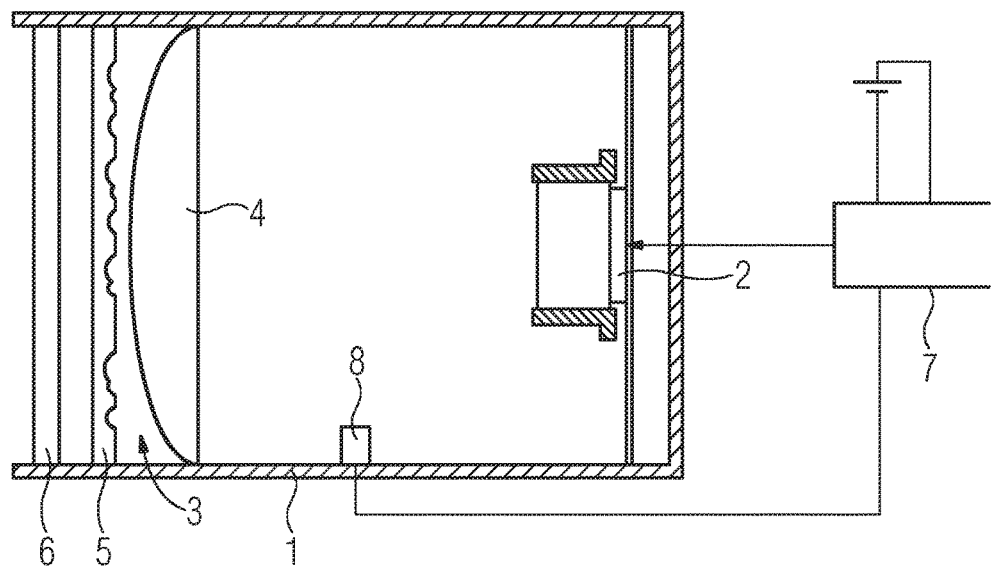
FIG. 1 shows a schematic representation of the light signal, of a known type, which is already described further above
Figure 2:
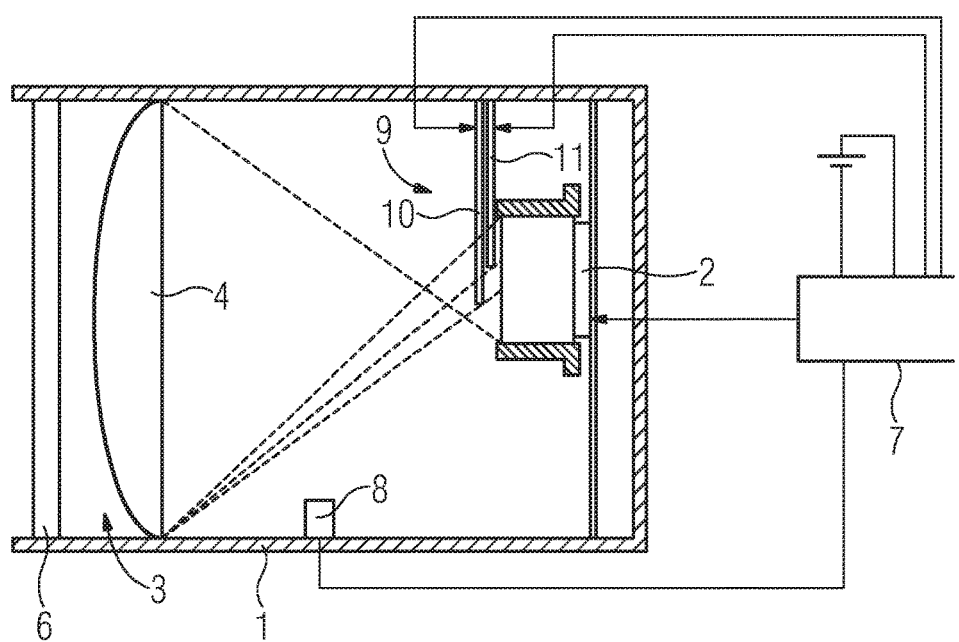
FIG. 2 shows an exemplary embodiment of a light signal of a claimed type in the same manner of representation as FIG. 1.

FIG. 2 shows a light signal, in which a smart-glass element 9 is arranged between the LED light source 2 and the optical system 3. In the exemplary embodiment the smart-glass element 9 consists of two separate smart-glass discs 10 and 11, which project to varying degrees in the light flow. Aside from the control signal for the LED light source 2, the control device 7 additionally also generates the control signals for the degree of transmission of the smart-glass discs 10 and 11. The last control signals may be entirely different in order to set the desired light distribution. In such cases the phantom effect can be reduced and at the same time a near and far range illumination can take place taking into consideration a curvy track route, in particular for the far range. The diffusion discs 5/FIG. 1 typically used for these requirements are therefore no longer required. The transmission-controllable smart-glass element 9 produces a considerably more precise adjustability of the requirements that may be relevant to the permissible brightness boundaries, if necessary also with continuous light intensity control for day, dusk and night operation, as well as the spatial distribution and the phantom light intensity.

The invention claimed is:

1. A light signal, comprising:
   a light source producing a light flow;
   a control device controlling said light source;
   an optical system for visualizing a signal term; and
   a transmission-controllable smart-glass element provided in an aperture segment of the light flow, said smart-glass element disposed in said aperture segment including a plurality of separate, transmission-adjustable, smart-glass discs.

2. The light signal according to claim 1, wherein said smart-glass element is disposed between said light source and said optical system.

3. The light signal according to claim 1, wherein said control device is configured to set a transmission of said smart-glass element.

4. The light signal according to claim 1, which further comprises at least one ambient light sensor connected to said control device.

5. The light signal according to claim 1, wherein said smart-glass discs are circular-segment-shaped.

6. The light signal according to claim 1, wherein said smart-glass element projects into the light flow.

7. The light signal according to claim 6, wherein said smart-glass element projects into one part of the light flow.

8. The light signal according to claim 1, wherein said smart-glass element is one of a plurality of smart-glass elements projecting to varying degrees into the light flow.

9. The light signal according to claim 1, wherein the light signal is configured to be disposed along a rail-bound traffic route.

* * * * *